US012720298B2

(12) United States Patent
Ogawa

(10) Patent No.: US 12,720,298 B2
(45) Date of Patent: Aug. 25, 2026

(54) METHOD, SYSTEM AND STORAGE MEDIUM STORING PROGRAM FOR MANAGING SETTING OF WIRELESS COMMUNICATION SERVICE

(71) Applicant: SORACOM, INC., Tokyo (JP)

(72) Inventor: Muneaki Ogawa, Tokyo (JP)

(73) Assignee: SORACOM, INC., Tokyo (JP)

( * ) Notice: Subject to any disclaimer, the term of this patent is extended or adjusted under 35 U.S.C. 154(b) by 224 days.

(21) Appl. No.: 18/627,773

(22) Filed: Apr. 5, 2024

(65) Prior Publication Data

US 2024/0251232 A1 Jul. 25, 2024

Related U.S. Application Data

(63) Continuation of application No. PCT/JP2022/024526, filed on Jun. 20, 2022.

(30) Foreign Application Priority Data

Oct. 13, 2021 (JP) ................................ 2021-168052

(51) Int. Cl.
*H04W 8/18* (2009.01)
*H04W 8/22* (2009.01)

(52) U.S. Cl.
CPC ............ *H04W 8/186* (2013.01); *H04W 8/22* (2013.01)

(58) Field of Classification Search
CPC ......... H04W 8/186; H04W 8/18; H04W 8/04; H04W 8/22; H04W 52/02; Y02D 30/70
See application file for complete search history.

(56) References Cited

U.S. PATENT DOCUMENTS 10,237,780 B2 * 3/2019 Kumar ................. H04W 60/06
2016/0066333 A1 3/2016 Suzuki et al.
2017/0195822 A1 7/2017 Watfa et al.
(Continued)

FOREIGN PATENT DOCUMENTS

JP 2017-519454 A 7/2017
JP 2017208614 A 11/2017
(Continued)

OTHER PUBLICATIONS

WO2023/062878A1, International Search Report and Written Opinion, Apr. 20, 2023.

*Primary Examiner* — William G Trost, IV
(74) *Attorney, Agent, or Firm* — WCF IP

(57) ABSTRACT

In this method for managing configuration of a wireless communication service, a setting value of a parameter used in a low power consumption state is changed en masse for a plurality of subscriber identifiers. From a subscriber, an apparatus 200 receives an update request, in association with a group identifier corresponding to a plurality of subscriber identifiers, that includes a setting value of the parameter, identifies the plurality of subscriber identifiers corresponding with the received group identifier, and transmits an update request. An HSS 230 updates the value of the parameter and transmits a CLR to an MME 220. The MME 220 transmits a detach request to a subscriber terminal 210 and receives a re-attach request. After an interval from transmitting the first update request, the apparatus 200 transmits a second update request (S311).

10 Claims, 4 Drawing Sheets

(56) References Cited

U.S. PATENT DOCUMENTS

| | | | | |
|---|---|---|---|---|
| 2018/0352530 | A1* | 12/2018 | Singh | H04W 76/23 |
| 2019/0239062 | A1* | 8/2019 | Baek | H04W 8/12 |

FOREIGN PATENT DOCUMENTS

| | | | | | |
|---|---|---|---|---|---|
| JP | 2019-029912 | A | | 2/2019 | |
| WO | 2013/065264 | A1 | | 5/2013 | |
| WO | WO-2014107381 | A1 | * | 7/2014 | H04W 12/06 |
| WO | 2014/184834 | A1 | | 11/2014 | |
| WO | WO-2016026746 | A1 | * | 2/2016 | H04W 8/186 |

* cited by examiner

METHOD, SYSTEM AND STORAGE MEDIUM STORING PROGRAM FOR MANAGING SETTING OF WIRELESS COMMUNICATION SERVICE

CROSS-REFERENCE TO RELATED APPLICATIONS

The present application is a continuation application of International Application number PCT/JP2022/024526, filed on Jun. 20, 2022, which claims priority under 35 U.S.C § 119(a) to Japanese Patent Application No. 2021-168052, filed on Oct. 13, 2021, contents of which are incorporated herein by reference in their entirety.

BACKGROUND OF THE INVENTION

The present disclosure relates to an apparatus, a method, and a program for managing configuration of a wireless communication service provided using a wireless communication infrastructure of an MNO.

There are a large number of wireless access technologies for an IoT device due to an increasing demand for wireless connectivity of various devices to an IP network such as the Internet. The 3GPP, a standards organization for wireless communications, developed the LTE-M and NB-IoT as standards based on LTE technology for cellular Low Power Wide Area (LPWA) which are now in commercial use.

Low-power consumption has been generally desired in IoT devices, and, for cellular LPWA, the 3GPP standardized the Power Saving Mode (PSM) in Release 12, and the extended Discontinuous Reception (eDRX) in Release 13.

In the PSM, a hibernate state is defined as a state of an IoT device, in addition to a connected (RRC_CONNECTED) state and an idle (RRC_IDLE) state. In the hibernate state, the minimum information collection performed in the idle state, such as paging reception and neighboring cell search are not performed, and power consumption is suppressed by switching off a power supply of a circuit used for information collection, such as an RF circuit or a baseband circuit. It is possible to set a first period Tactive that starts when an IoT device enters the idle state and continues until it transitions to the hibernate state and a second period Tpsm that starts when an IoT device enters the idle state and continues until it exits from the hibernate state. When the second period Tpsm has elapsed or when an IoT device wants to resume communication, the IoT device in the hibernate state performs a Tracking Area Update (TAU), which is a procedure of updating location information of the device, stored in a Mobility Management Entity (MME). Under the current specifications, the second period Tpsm can be set for up to 310 hours.

Power consumption in the idle state is suppressed by eDRX temporarily switching off a power supply of a circuit such as an RF circuit or a baseband circuit, after the first period Tptw has elapsed from a certain point in time, and until a second period Tedrx elapses from that same certain point in time. Under the current specifications, the second period Tedrx can be set for up to 10485.76 second. It should be noted that the subscript of Tptw is an acronym of "paging time window."

It is possible to suppress power consumption in an IoT device by using functions compliant with the PSM and eDRX standards, but a subscriber of a wireless communication service used by the IoT device may want to set a desired value for each of the above-described periods according to the respective needs.

Since a final set value of a parameter for an IoT device varies depending on a policy of each carrier, that is, a Mobile Network Operator (MNO), and is determined by a facility included in a wireless communication infrastructure of the MNO, the value cannot always be determined by a Mobile Virtual Network Operator (MVNO) (see FIG. 1), which provides a wireless communication service for accessing an IP network such as the Internet by using the wireless communication infrastructure of the MNO. However, there are cases where a value stored in a Home Subscriber Server (HSS) of an MVNO is given priority. When a Mobile Virtual Network Enabler (MVNE), which provides a support service for smooth operation of the MVNO, intervenes between the MNO and the MVNO, there are cases where a value stored in the HSS of the MVNE is given priority.

However, even in such a case, the values of parameters used for functions compliant with the PSM and eDRX standards have to be set individually, as they are stored in the HSS as subscriber information in association with subscriber identifiers such as an IMSI. The number of IoT devices managed by subscribers of wireless communication services provided by an MVNO or an MVNE is expected to be in the thousands or even tens of thousands, and individually setting these devices is a significant burden.

BRIEF SUMMARY OF THE INVENTION

The present disclosure focuses on these points, and an object thereof is to collectively change, for a plurality of subscriber identifiers, setting values of one or more parameters used in a low-power consumption state in a subscriber information database in an apparatus, a method, or a program for managing configuration of a wireless communication service provided using a wireless communication infrastructure of an MNO.

Under the current specifications, it should be noted that states for reducing power consumption includes an idle state and a hibernate state, and two different parameter values or timer values can be set for each state, but the states include those defined by future specifications, which are more generally referred to as a "low-power consumption state" herein.

Further, the technical term "HSS," that have thus far been used for 4G. For 5G, this corresponds to "Unified Data Management (UDM)" and "Unified Data Repository (UDR)." Although the term HSS is used in the following description, the technical terminology is subject to change with the developments in communication standards and does not exclude equivalent functions. HSS is more generally referred to as "subscriber information database."

The first aspect of the present disclosure provides a method for managing configuration of a wireless communication service provided using a wireless communication infrastructure of an MNO, the method includes the steps of identifying, by a server, a plurality of subscriber identifiers associated with a group identifier, transmitting, by the server, to a subscriber information database a first update request including a first subscriber identifier, included in the plurality of subscriber identifiers, and a setting value of a parameter used in a low-power consumption state, transmitting, by the server or the subscriber information database, to a first subscriber terminal having the first subscriber identifier a request for a first detachment of the first subscriber identifier, the first detachment necessitating a reattachment, and transmitting, by the server, to the subscriber information database a second update request, including a second subscriber identifier that is different from the first subscriber identifier and is included in the plurality of subscriber identifiers, at intervals after the server transmits the first update request.

Further, a second aspect of the present disclosure provides a storage medium for non-transitorily storing a program for causing a system comprising one or more computers to execute a method for managing configuration of a wireless communication service provided using a wireless communication infrastructure of an MNO, the method includes the steps of identifying, by a server, a plurality of subscriber identifiers associated with a group identifier, transmitting, by the server, to a subscriber information database a first update request including a first subscriber identifier, included in the plurality of subscriber identifiers, and a setting value of a parameter used in a low-power consumption state, transmitting, by the server or the subscriber information database, to a first subscriber terminal having the first subscriber identifier a request for a first detachment of the first subscriber identifier, the first detachment necessitating a reattachment, and transmitting, by the server, to the subscriber information database a second update request, including a second subscriber identifier that is different from the first subscriber identifier and is included in the plurality of subscriber identifiers, at intervals after the server transmits the first update request.

Furthermore, a third aspect of the present disclosure provides a system for managing configuration of a wireless communication service provided using a wireless communication infrastructure of an MNO, the system includes a server, and a subscriber information database capable of communicating with the server, wherein the server identifies a plurality of subscriber identifiers associated with a group identifier, and transmits to the subscriber information database i) a first update request including a first subscriber identifier included in the plurality of subscriber identifiers and ii) a setting value of a parameter used in a low-power consumption state, the server or the subscriber information database transmits to a first subscriber terminal having the first subscriber identifier a request for a first detachment of the first subscriber identifier, the first detachment necessitating a reattachment, and the server further transmits to the subscriber information database a second update request, including a second subscriber identifier that is different from the first subscriber identifier and is included in the plurality of subscriber identifiers, at intervals after transmitting the update request.

According to an aspect of the present disclosure, in a system for managing configuration of a wireless communication service provided using a wireless communication infrastructure of an MNO, a server in the system transmits to a subscriber information database that can communicate with the server a first update request including a first subscriber identifier included in a plurality of subscriber identifiers associated with a group identifier and a set value of a parameter used in a low-power consumption state. Then, the server or the subscriber information database transmits, to a first subscriber terminal having the first subscriber identifier, a request for a first detachment of the first subscriber identifier, the first detachment necessitating a reattachment, and then, after an interval, the server transmits, to the subscriber database, a second update request including a second subscriber identifier different from the first subscriber identifier, so that setting values of the parameter in the subscriber information database can be changed collectively for a plurality of subscriber identifiers identified by the group identifier.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

Embodiments of the present disclosure will be described in detail below with reference to the drawings.

Figure 1:
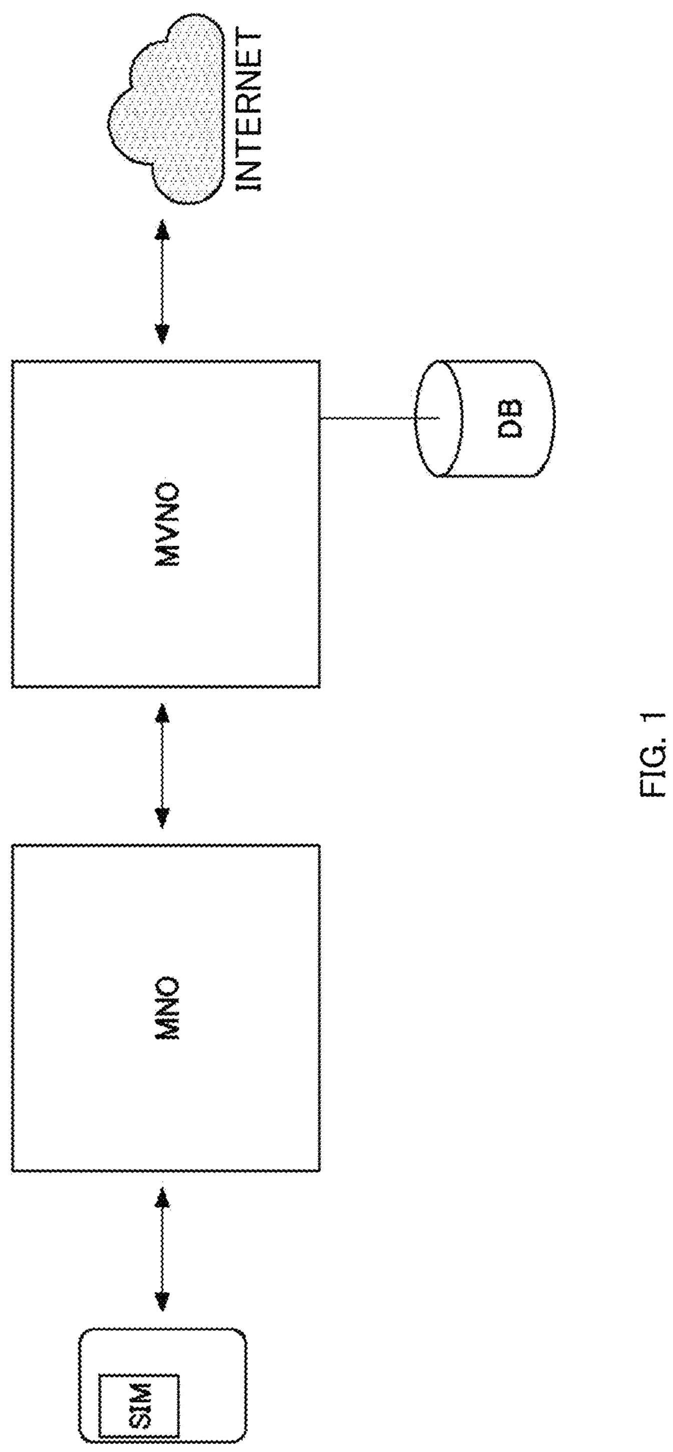
FIG. 1 illustrates an MVNO that provides a wireless communication service using a wireless communication infrastructure of an MNO.
Figure 2:
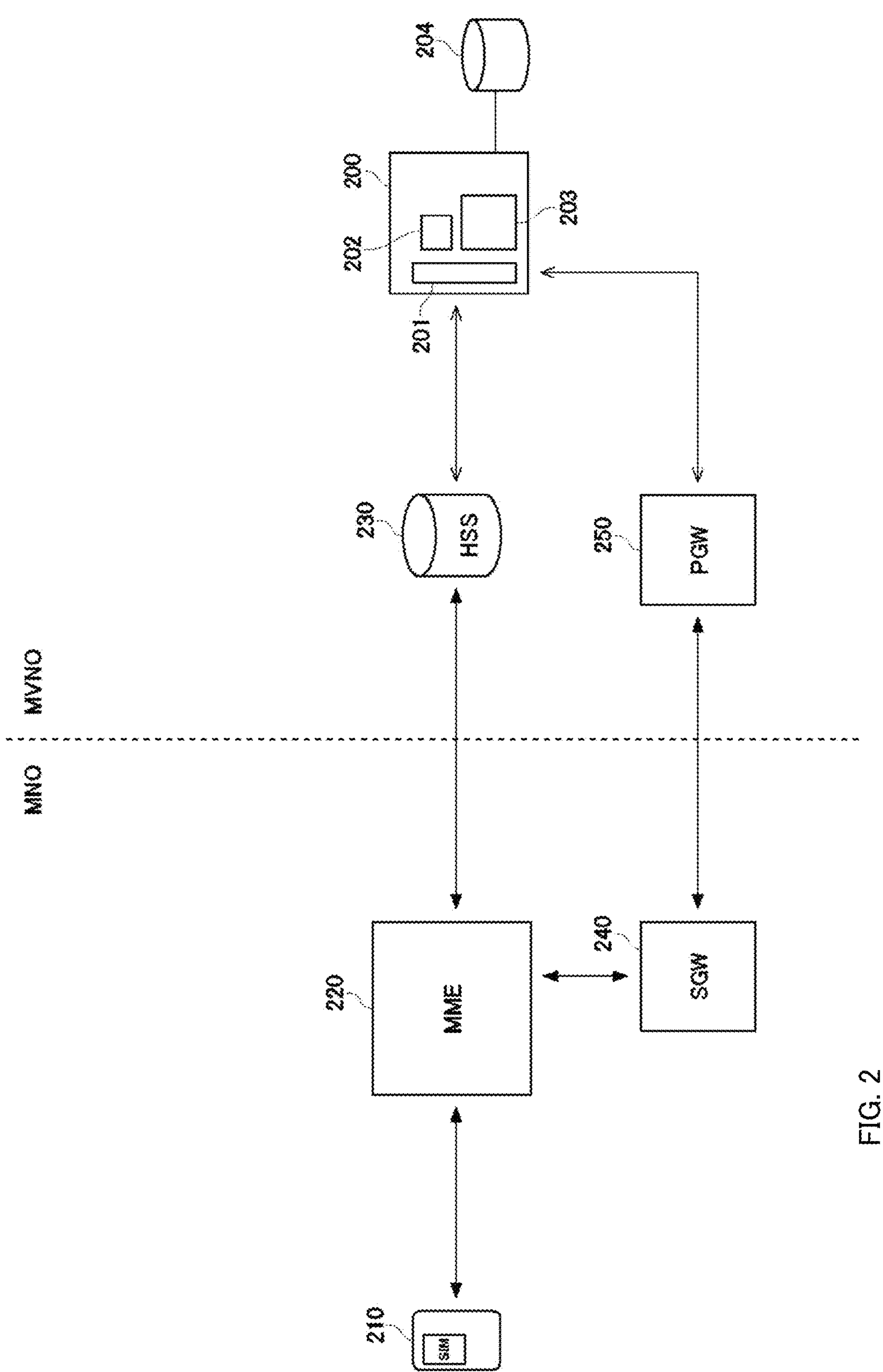
FIG. 2 shows a system according to an embodiment of the present disclosure.

FIG. 2 shows a system according to an embodiment of the present disclosure. An apparatus 200 included in the system is an apparatus for managing configuration of a wireless communication service provided using a wireless communication infrastructure of an MNO, and can communicate with an HSS 230, for example, by being compliant with HTTP protocol, and more specifically, using a REST API. As used herein, a “system” includes at least some of a plurality of components shown in FIG. 2.

Both the apparatus 200 and the HSS 230 may be a facility of an MVNO or an MVNE that provides a wireless communication service using a wireless communication infrastructure of an MNO. The apparatus 200 may be one or more instances on a cloud or public cloud, and the HSS 230 may also be one or more instances on the same or different cloud or public cloud. As used herein, a “cloud” refers to a system capable of dynamically provisioning and providing computing resources such as CPU, memory, storage, and network bandwidth on a network according to demand. For example, a cloud can be used by AWS (registered trademark) or the like. Further, a “public cloud” refers to a cloud that can be used by a plurality of tenants.

A subscriber terminal 210 communicates with the MME 220, which is a facility included in a wireless communications infrastructure of an MNO, in order to establish a communication connection via a cellular system such as cellular LPWA using its SIM. More specifically, the subscriber terminal 210 transmits an attach request to the MME 220, and the MME 220 having received the attach request makes a request called an Update Location Request (ULR), including a subscriber identifier such as an IMSI included in the attach request, to the HSS 230. The HSS 230 stores subscriber information and location information in association with the subscriber identifier, and the subscriber information may include setting values of one or more parameters used in a low-power consumption state. An Update Location Answer (ULA) is transmitted from the HSS 230 to the MME 220 as a response to the ULR, and the ULA may include a set value of at least some of the one or more parameters. The MME 220 having received the ULA transmits a notification, indicating that an attachment has been made, to the subscriber terminal 210. The notification includes the setting values of one or more parameters used in the low-power consumption state determined in the MME 220. If the setting values of one or more parameters included in the ULA are given priority, they become final set value to the subscriber terminal 210.

Although the current specification includes four kinds of parameters, the following description will focus on any one parameter for simplicity. Further, it is preferable to change the values stored in the HSS for all the parameters through the management method according to the present embodiment, but advantages of the present disclosure can be obtained even when the values are changed for only some of the parameters.

The apparatus 200 includes a communication unit 201 such as a communication interface, a processing unit 202 such as a processor or a CPU, and a storage unit 203 including a storage device or a storage medium such as a memory or a hard disk, and which can be configured by executing a program for performing each process. The apparatus 200 may include one or more apparatuses, computers, instances, or servers. Further, the program may include one or more programs, and may be recorded on a computer-readable storage medium as a non-transitory program product. The program can be stored in a storage device or a storage medium such as a database 204 accessible from the storage unit 203 or the apparatus 200 via an IP network, and can be executed by the processing unit 202. Data described below as being stored in the storage unit 203 may be stored in the database 204 and vice versa.

In the above description, the technical term "MME," that has thus far been used for 4G. For 5G, this corresponds to "Access and Mobility management Function (AMF)." Although the term "MME" is used in the following description, the technical terminology is subject to change with developments in communication standards and does not exclude equivalent functions. MME is more generally referred to as "mobility management facility." Further, in the following description, the technical terms for 4G "SGW" and "PGW" are used, and "an SGW" and "a PGW" have both "a function on the C-lane" and "a function on the U-plane." More generally, the function on the C-plane of an SGW is called "a gateway on the C-plane included in a communication infrastructure of an MNO" and the function on the U-plane is called "a gateway on the U-plane included in a communication infrastructure of an MNO." The function on the C-plane of a PGW is called "a gateway on the C-plane connected to a communication infrastructure of an MNO," and the function on the U-plane is called "a gateway on the U-plane connected to a communication infrastructure of an MNO." A PGW corresponds to a facility included in a communication infrastructure of an MVNO or an MVNE. Control and User Plane Separation (CUPS) may be applied to an SGW and a PGW to separately arrange the gateway on the C-plane from the gateway on the U-plane. In 5G, "a gateway on the C-plane" corresponds to "Session Management Function (SMF)," and "a gateway on the U-plane" corresponds to "User Plane Function (UPF)."

The apparatus 200 receives, from a subscriber, an input including a setting value of a parameter used in a low-power consumption state in association with a group identifier corresponding to a plurality of subscriber identifiers through a management screen for managing configuration of a wireless communication service subscribed to by the subscriber, and stores the input in the storage unit 203. The input may include, in addition to a new value of the parameter, an interval for updating a plurality of subscriber identifiers corresponding to the group identifier. It is described here that data is inputted through the management screen, but the management screen does not have to be used if the apparatus 200 can receive the new value of the parameter used in the low-power consumption state, the group identifier corresponding to a plurality of subscriber identifiers to be updated with the new value, and the interval for updating the plurality of subscriber identifiers as necessary. The update interval may be predefined in the apparatus 200 if it is not specified by the subscriber.

The apparatus 200 then first identifies a plurality of subscriber identifiers corresponding to the group identifier, on the basis of the received group identifier (S301). To this end, the apparatus 200 may be able to access an association of one or more group identifiers with a plurality of subscriber identifiers corresponding to each group identifier.

Next, the apparatus 200 transmits, for a first subscriber identifier included in the plurality of subscriber identifiers, a first update request including the first subscriber identifier and the new value of the parameter to the HSS 230 (S302). The first update request is not necessarily transmitted all at once, and the first subscriber identifier and the new value of the parameter may be transmitted separately to the HSS 230. The HSS 230 updates the value of the parameter associated with the first subscriber identifier to the new value (S303), and transmits a Cancel Location Request (CLR) to the MME 220 to cancel location registration of the first subscriber identifier (S304). The CLR includes a designation of a need for a reattachment after cancellation of the location registration. This designation may be given by setting a "Reattach-Required" bit of the CLR-Flag, for example. The cancellation of the location registration by the CLR deletes the subscriber information in addition to the location information. The MME 220 that has received the CLR transmits a detach request to the subscriber terminal 210 (S305). The detach request includes, on the basis of the designation included in the CLR, a designation of the need of a reattachment in the same manner.

After the MME 220 receives a notification, indicating that a detachment has been made, from the subscriber terminal 210 (S306), the MME 220 transmits a session deletion request called "Delete Session Request" to the PGW 250 via the SGW 240, and the session is deleted (not shown in figures for simplicity). The MME 220 may transmit the session deletion request without waiting for the notification indicating that the detachment has been made.

The subscriber terminal 210 then transmits a reattach request to the MME 220 (S307), and the MME 220 transmits a ULR to the HSS 230 (S308). The HSS 230 returns a ULA to the MME 220 (S309), and the MME 220 transmits a session creation request called "Create Session Request" to the PGW 250 via the SGW 240, and a session is created (not shown in figures for simplicity). After that, the MME 220 transmits a notification, indicating that a reattachment has been made, to the subscriber terminal 210 (S310). This notification includes the setting value of the parameter determined by the MME 220.

Figure 3:
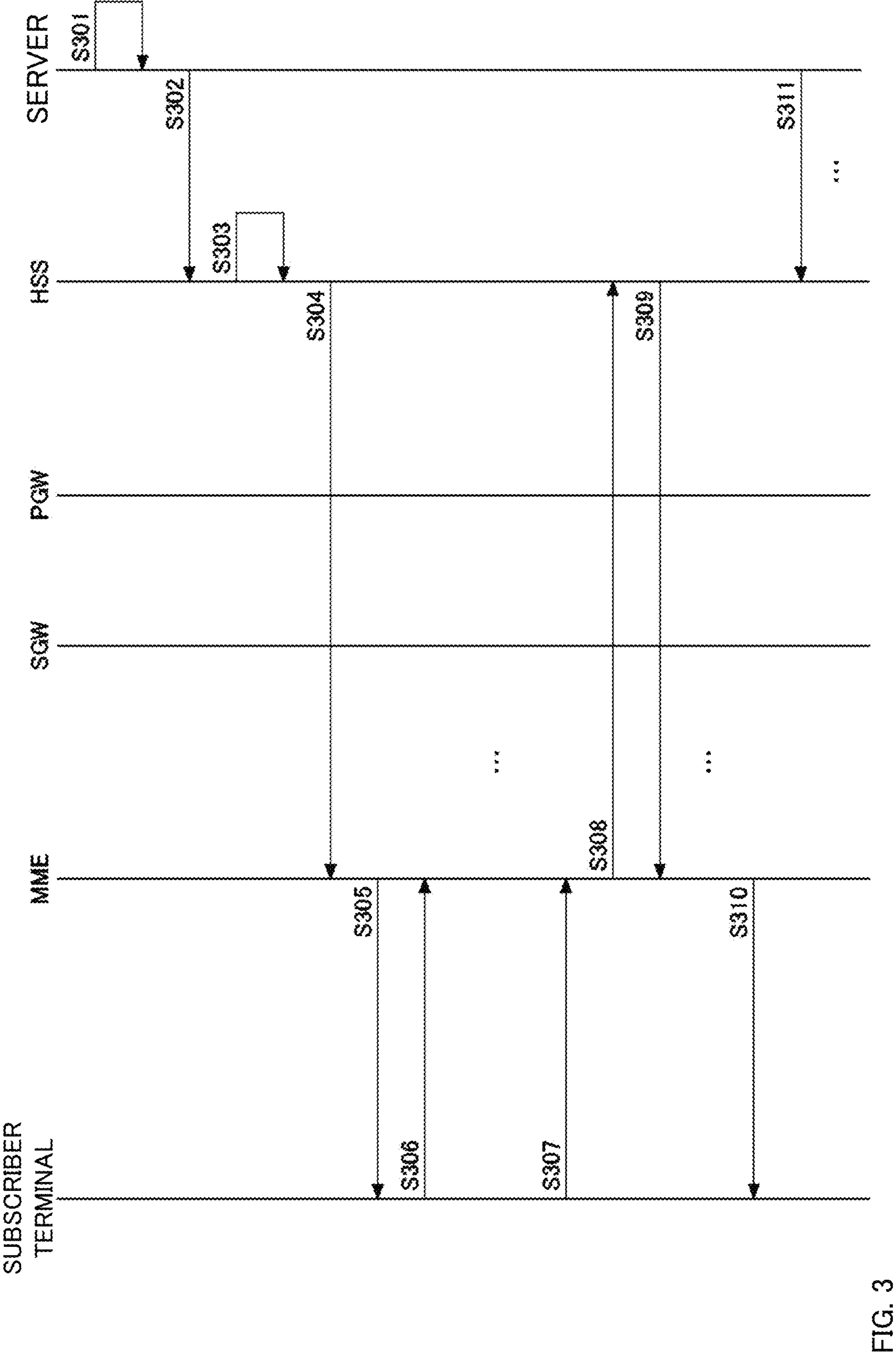
FIG. 3 is a flowchart showing a management method according to an embodiment of the present disclosure.
Figure 4:
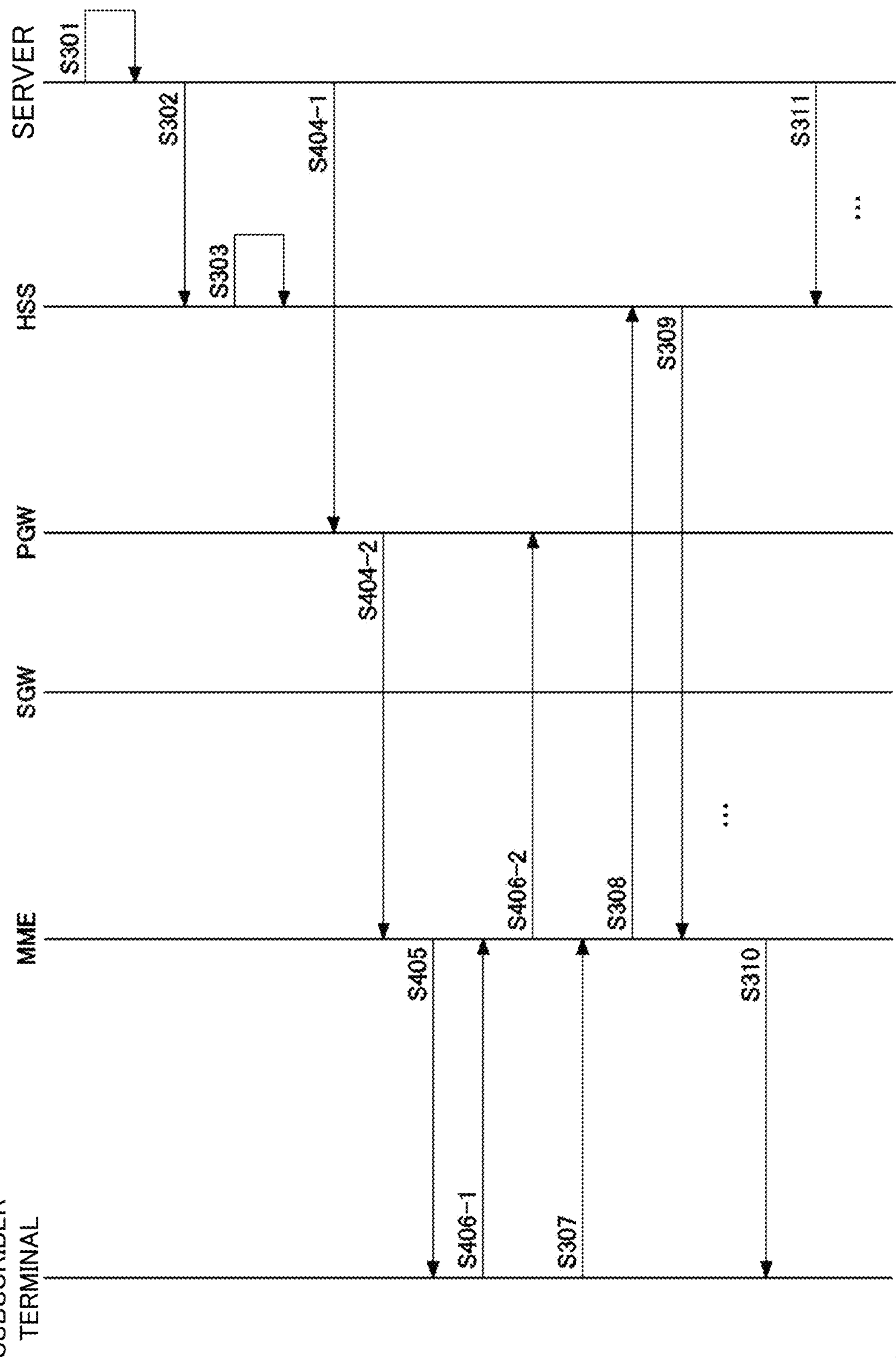
FIG. 4 is a flowchart showing a management method according to an alternative embodiment of the present disclosure.

If the apparatus 200 stores an update interval in association with the group identifier or the plurality of subscriber identifiers corresponding thereto, the apparatus 200 transmits the first update request for the first subscriber identifier to the HSS 230, and then transmits the second update request for the second subscriber identifier included in the plurality of subscriber identifiers at the update interval or an interval substantially corresponding thereto (S311). In FIG. 3, the second update request is transmitted after the notification that the reattach has been made is transmitted from the MME 220 to the subscriber terminal 210, but this is merely an example, and the timing of the transmission of the second update request depends on a value of the update interval. Further, as in the first update request, the second update request may also include a new value for the parameter used in the low-power consumption state, or the value transmitted to the HSS 230 by the first update request may also be used in the HSS 230 for the second subscriber identifier. Further, as in the case of the first update request, if the second update request includes a new value, the second subscriber identifier and the new value of the parameter are not necessarily transmitted all at once and may be transmitted separately to the HSS 230.

In an alternative embodiment of the present disclosure, the apparatus 200 may transmit a request for transmitting a bearer deletion request called "Delete Bearer Request" to the PGW 250 (S404-1), instead of the HSS 230 transmitting a CLR as a request for detachment to the MME 220. The bearer deletion request includes a designation of the need for reattachment after the bearer deletion. This designation may be given by setting a Cause value "Reactivation Requested," for example. The PGW 250 then transmits a bearer deletion request to the MME 220 via the SGW 240, and the MME 220 transmits a detach request to the subscriber terminal 210 (S405). The detach request includes, on the basis of the designation included in the bearer deletion request, a designation of the need of a reattachment in the same manner. Thus, the request for detaching the subscriber identifier need only be transmitted to the subscriber terminal 210, and it is not necessarily transmitted directly to the MME 220.

After the MME 220 receives a notification, indicating that a detachment has been made, from the subscriber terminal 210 (S406-1), the MME 220 transmits a bearer deletion response called "Delete Bearer Response" to the PGW 250 via the SGW 240 (S406-2). The subsequent steps may be the same as in the embodiment described with reference to FIG. 3.

As described above, according to an embodiment of the present disclosure, a subscriber can collectively change, for a plurality of subscriber identifiers, setting values of parameters in the subscriber information database by i) receiving a new value of a parameter used in a low-power consumption state and a group identifier corresponding to a plurality of subscriber identifiers to be updated with the new value, and ii) causing a detachment and a reattachment to be sequentially made for the plurality of subscriber identifiers corresponding to the group identifier.

It should be noted that roaming is not specifically mentioned in the above description, but the present disclosure is applicable in a similar manner even if the MME 220 is a mobility management facility of an MNO which is a roaming partner of an MVNO or an MVNE that issues a SIM for the subscriber terminal 210.

It should be noted that in the embodiments described above, it is assumed that additional information can also be taken into account herein unless the word "only" is mentioned, such as "based only on xx," "according to xx only" or "for xx only." Further, as an example, it is to be noted that the statement "b in case a" does not necessarily mean "always b in case a" or "b immediately after a" unless explicitly stated. Furthermore, the phrase "each a comprising A" does not necessarily mean that A is composed of a plurality of components, and includes the fact that A is composed of a single component.

In addition, for clarity, it should be added that even if there is an aspect of any method, program, terminal, apparatus, server or system (hereinafter, "Methods") that operate differently from the operations described herein, each aspect of the present disclosure covers the same operation as any of the operations described herein, and the existence of an operation different from those described herein does not mean such Methods are outside the scope of each aspect of the disclosure.

What is claimed is:

1. A method for managing configuration of a wireless communication service provided using a wireless communication infrastructure of an MNO, the method comprising the steps of:

identifying, by a server, a plurality of subscriber identifiers associated with a group identifier;

transmitting, by the server, to a subscriber information database a first update request including a first subscriber identifier, included in the plurality of subscriber identifiers, and a setting value of a parameter used in a low-power consumption state;

transmitting, by the server or the subscriber information database, to a first subscriber terminal having the first subscriber identifier a request for a first detachment of the first subscriber identifier, the first detachment necessitating a reattachment; and transmitting, by the server, to the subscriber information database a second update request, including a second subscriber identifier that is different from the first subscriber identifier and is included in the plurality of subscriber identifiers, at intervals after the server transmits the first update request.

2. The method according to claim 1, wherein the first update request is compliant with HTTP protocol.

3. The method according to claim 1, wherein the request for the first detachment is transmitted from the subscriber information database to a mobility management facility included in a wireless communication infrastructure of the MNO.

4. The method according to claim 3, wherein each of the server and the subscriber information database is a facility included in a wireless communication infrastructure of an MVNO or an MVNE that provides a wireless communication service using a wireless communication infrastructure of the MNO.

5. The method according to claim 1, wherein the request for the first detachment is transmitted from the server to a gateway on the U-plane connected to a wireless communication infrastructure of the MNO.

6. The method according to claim 5, wherein each of the server, the subscriber information database, and a gateway on the U-plane is a facility included in a wireless communication infrastructure of an MVNO or an MVNE that provides a wireless communication service using a wireless communication infrastructure of the MNO.

7. The method according to claim 4, wherein a wireless communication infrastructure of the MVNO or the MVNE is one or more instances on a public cloud.

8. The method according to claim 1, wherein the server stores an update interval in association with the group identifier or the plurality of subscriber identifiers, and the server transmits the second update request after transmitting the first update request at intervals based on the update interval.

9. A non-transitory storage medium for storing a program for causing a system comprising one or more computers to execute a method for managing configuration of a wireless communication service provided using a wireless communication infrastructure of an MNO, the method comprising the steps of:

identifying, by a server, a plurality of subscriber identifiers associated with a group identifier;

transmitting, by the server, to a subscriber information database a first update request including a first subscriber identifier, included in the plurality of subscriber identifiers, and a setting value of a parameter used in a low-power consumption state;

transmitting, by the server or the subscriber information database, to a first subscriber terminal having the first subscriber identifier a request for a first detachment of the first subscriber identifier, the first detachment necessitating a reattachment; and transmitting, by the server, to the subscriber information database a second update request, including a second subscriber identifier that is different from the first subscriber identifier and is included in the plurality of subscriber identifiers, at intervals after the server transmits the first update request.

10. A system for managing configuration of a wireless communication service provided using a wireless communication infrastructure of an MNO, the system comprising:

a server; and a subscriber information database capable of communicating with the server, wherein the server identifies a plurality of subscriber identifiers associated with a group identifier, and transmits to the subscriber information database i) a first update request including a first subscriber identifier included in the plurality of subscriber identifiers and ii) a setting value of a parameter used in a low-power consumption state, the server or the subscriber information database transmits to a first subscriber terminal having the first subscriber identifier a request for a first detachment of the first subscriber identifier, the first detachment necessitating a reattachment, and the server further transmits to the subscriber information database a second update request, including a second subscriber identifier that is different from the first subscriber identifier and is included in the plurality of subscriber identifiers, at intervals after transmitting the update request.

* * * * *